United States Patent [19]
Reilly

[11] Patent Number: 5,826,346
[45] Date of Patent: Oct. 27, 1998

[54] MEASURING GAGE

[76] Inventor: Paul J. Reilly, 560 N. Moorpark Rd., No. 150, Thousand Oaks, Calif. 91360

[21] Appl. No.: 603,170

[22] Filed: Feb. 20, 1996

Related U.S. Application Data

[63] Continuation-in-part of Ser. No. 295,428, Aug. 25, 1994, Pat. No. 5,491,906.

[51] Int. Cl.⁶ .................................................. B27G 23/00
[52] U.S. Cl. ............................................. 33/640; 33/832
[58] Field of Search ............................. 33/640, 465, 471, 33/626, 630, 633, 634, 424, 538, 534, 832, 833; 83/522.15, 522.16, 522.17, 522.18, 522.19

[56] References Cited

U.S. PATENT DOCUMENTS

| | | | |
|---|---|---|---|
| 3,251,133 | 5/1966 | Turtschan | 33/832 |
| 5,036,596 | 8/1991 | Gyoury et al. | 33/832 |
| 5,168,637 | 12/1992 | Gibson | 33/640 |
| 5,491,906 | 2/1996 | Reilly | 33/640 |
| 5,491,907 | 2/1996 | Vidmar | 33/832 |

*Primary Examiner*—Christopher W. Fulton
*Attorney, Agent, or Firm*—Allen A. Dicke, Jr.

[57] ABSTRACT

The measuring gage has a body which is positioned in the upright direction for vertical measurement or can be positioned in any direction for other measurements. The body includes a notched land area for nesting a ruler which is locked in by rotatable stops to restrict ruler movement. A further recessed area within the ruler land area houses a strip magnet to hold the ruler. Two half-round configurations simulate vertical rods which serve as ways upon which the measuring arm and protractor housing ride. A T-shaped slot between the half-round rod ways acts to retain a nut for the measuring arm. The measuring arm can glide along the body and measure the height directly against the ruler. The magnetic strip retains the ruler in its nested area when the gage body is in a vertical position and unsecured by the cam locks.

22 Claims, 7 Drawing Sheets

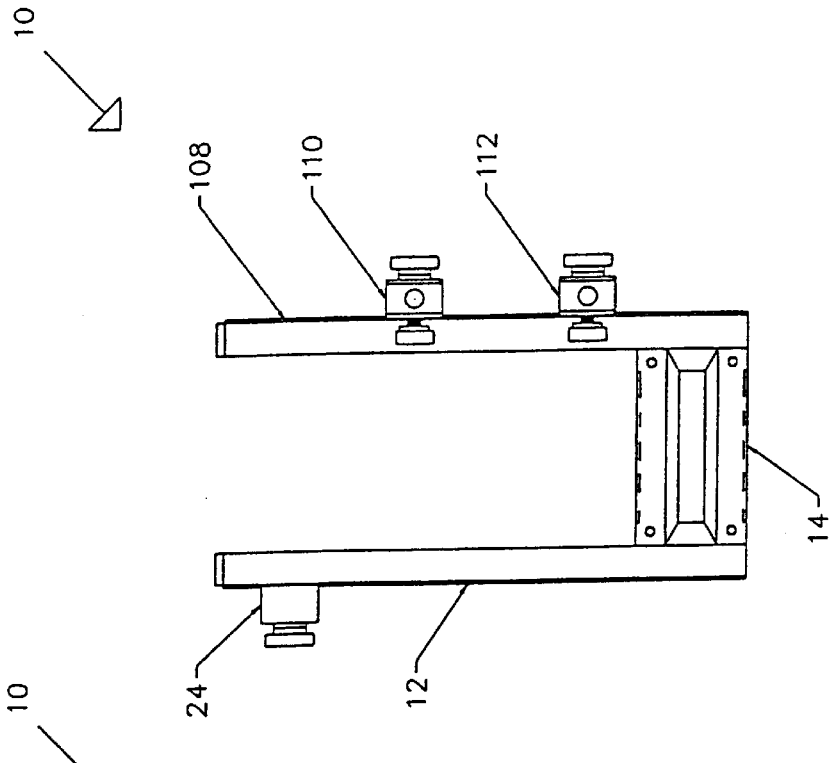
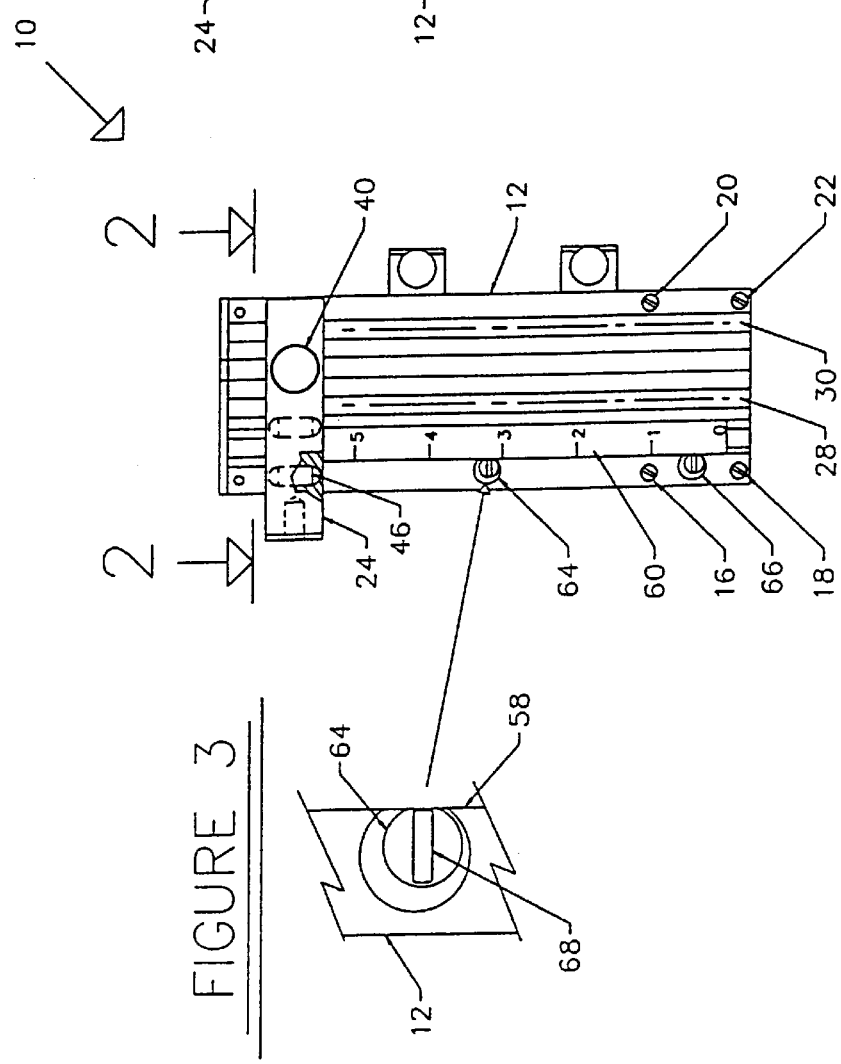

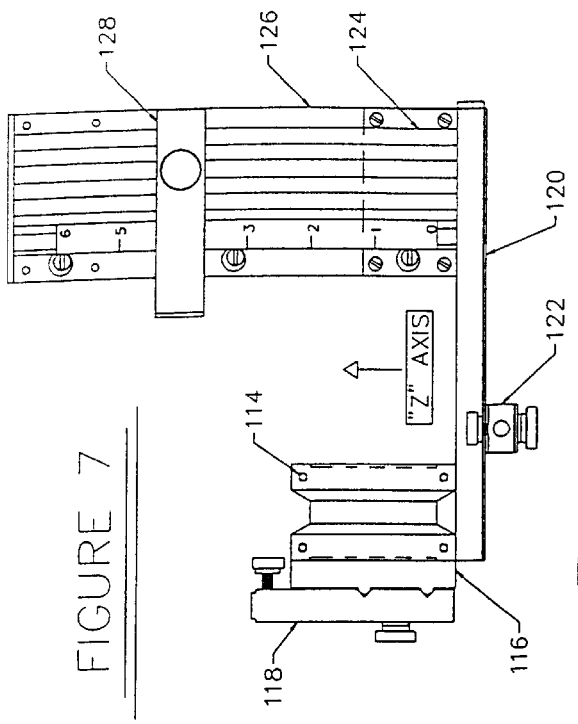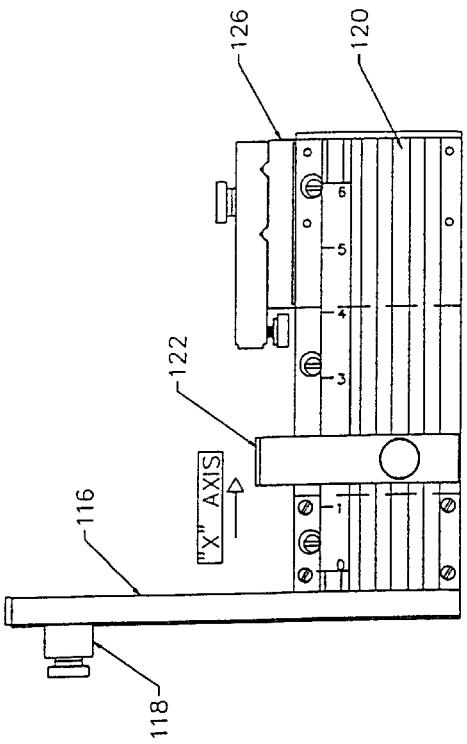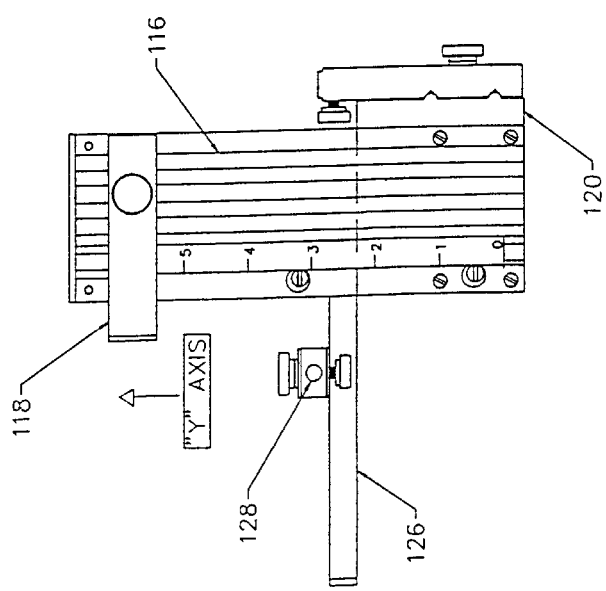

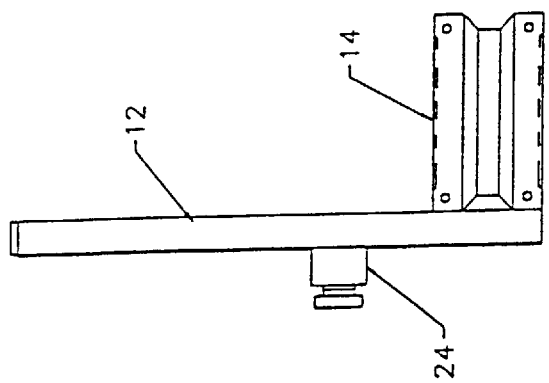
FIGURE 17
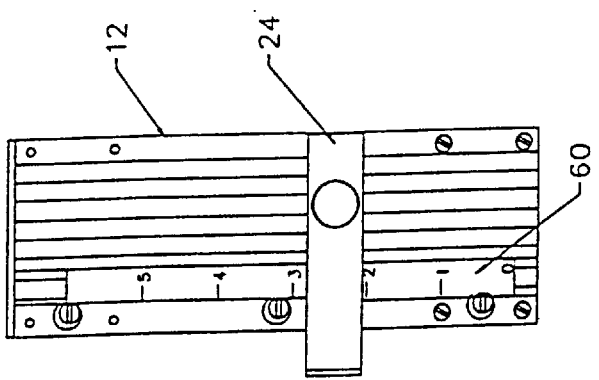
FIGURE 18
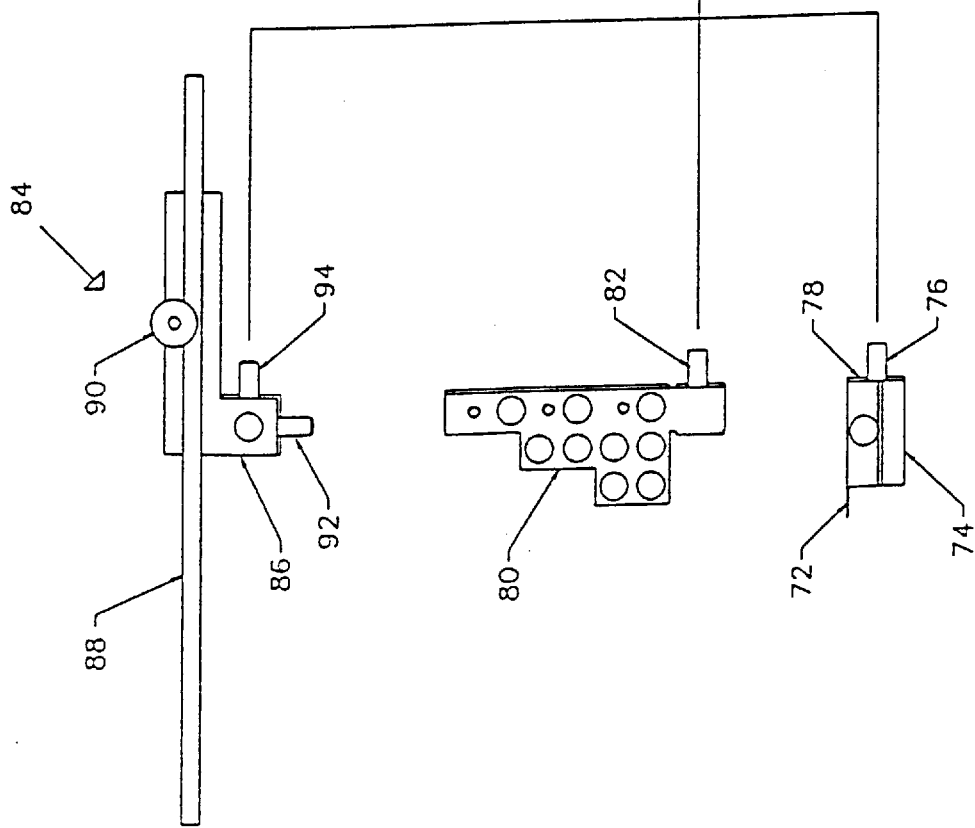

MEASURING GAGE

CROSS-REFERENCE

This application is a continuation-in-part of my earlier application, Ser. No. 08/295,428, filed Aug. 25, 1994, for "Master Gage," now U.S. Pat. No. 5,491,906, granted Feb. 20, 1996, the entire disclosure of which is incorporated herein.

FIELD OF THE INVENTION

This invention is directed to a gage which is suitable for measuring and marking height, length, width and depth of parts in metalworking, woodworking, model making and other trades and crafts.

BACKGROUND OF THE INVENTION

In the trades and crafts fields, both metal working, woodworking and other craft endeavors, it is required to take height, length and depth measurements of stock, parts, products, etc. In the highly specialized field of metal working, one of the principal instruments of measurement is the height gage, for which the measuring gage of this invention is particularly useful. As the name implies, the height gage is restricted to measuring parts and products in a vertical linear fashion. Parts must be rotated and aligned to present themselves to the height gage in a vertical axis. The height gage has fixed single scales or an electronic digital unit to indicate height dimensions. The basic use of the height gage is to indicate and verify height dimensions. Although it is highly accurate, it is restricted in its versatility and is one-dimensional in its applications. Because of its high costs and sensitivity, the standard height gage is restricted to the confines of the inspection department. With the automation of production and the high volume of parts and products that are produced, it creates a difficult environment for quality control to measure parts in great numbers and control the high standard of excellence that their industry demands.

SUMMARY OF THE INVENTION

In order to aid in the understanding of this invention, it can be stated in essentially summary form that it is directed to a scale-carrying gage bar with parallel ways thereon for slidably carrying a measuring arm and/or protractor.

It is, thus, a purpose and advantage of this invention to provide a multiple use gage that can measure height, width, depth and angularity of parts in an accurate manner. This modular system can be assembled to measure multiple points along the "X", "Y" and "Z" axes at one time and also measures angularity.

It is a further purpose and advantage of this invention to provide a multiple use gage which is easy to use and which is of economic construction so that it can be widely distributed to save time and money in the manual trades and crafts.

It is another purpose and advantage of this invention to be able to use various rulers with different measuring standards.

It is another purpose and advantage of this invention to provide a gage which can be used as a height gage when its body is upright and which can be used as a length gage when its body is oriented longitudinally with the part to be measured, and can be used as a depth gage for the Z-axis.

It is a further purpose and advantage of this invention to provide a gage which can carry any one of a plurality of attachment devices thereon to provide wide utility in gaging and measurement.

It is another purpose and advantage of this invention to provide a gage which has a body of selected length and selected scale length dependent on the length to be measured.

Other purposes and advantages of this invention will become apparent from a study of the following portion of the specification, the claims and the attached drawings.

BRIEF DESCRIPTION OF THE DRAWINGS

FIG. 1 is a front elevational view of the measuring gage of this invention.

FIG. 3 is an enlarged detail of a portion of the structure shown in FIG. 1.

FIG. 4 is a right side elevational view of the structure of FIG. 1 showing that several gage bodies may be attached to a single base.

FIG. 5 is a front elevational view of the measuring gage of this invention shown with three gage bodies attached to two bases.

FIG. 6 is a right side elevational view thereof.

FIG. 7 is a plan view thereof.

FIG. 17 is an edge view of the height gage of this invention assembled with only one base, one body and one measuring bar, in its simplest configuration.

FIG. 18 is a front view thereof showing three accessories which can be used in association therewith.

DESCRIPTION OF THE PREFERRED EMBODIMENTS

FIG. 1 shows a front elevational view and FIG. 4 shows a right side elevational view of the first preferred embodiment of the measuring gage of this invention, which is generally indicated at 10. The height gage 10 has a gage body 12, which is secured to a base 14. The base 14 is shown in more detail in FIGS. 11, 12 and 13, which will be described subsequently in more detail. Suffice it to say that the base is square in plan view, and each of the four sides is provided with four mounting holes in the same relationship. Gage body 12 has four screws 16, 18, 20 and 22 which engage through holes in the gage body thread into the corresponding holes in the base 14 to detachably mount the gage body on the base.

Figure 2:
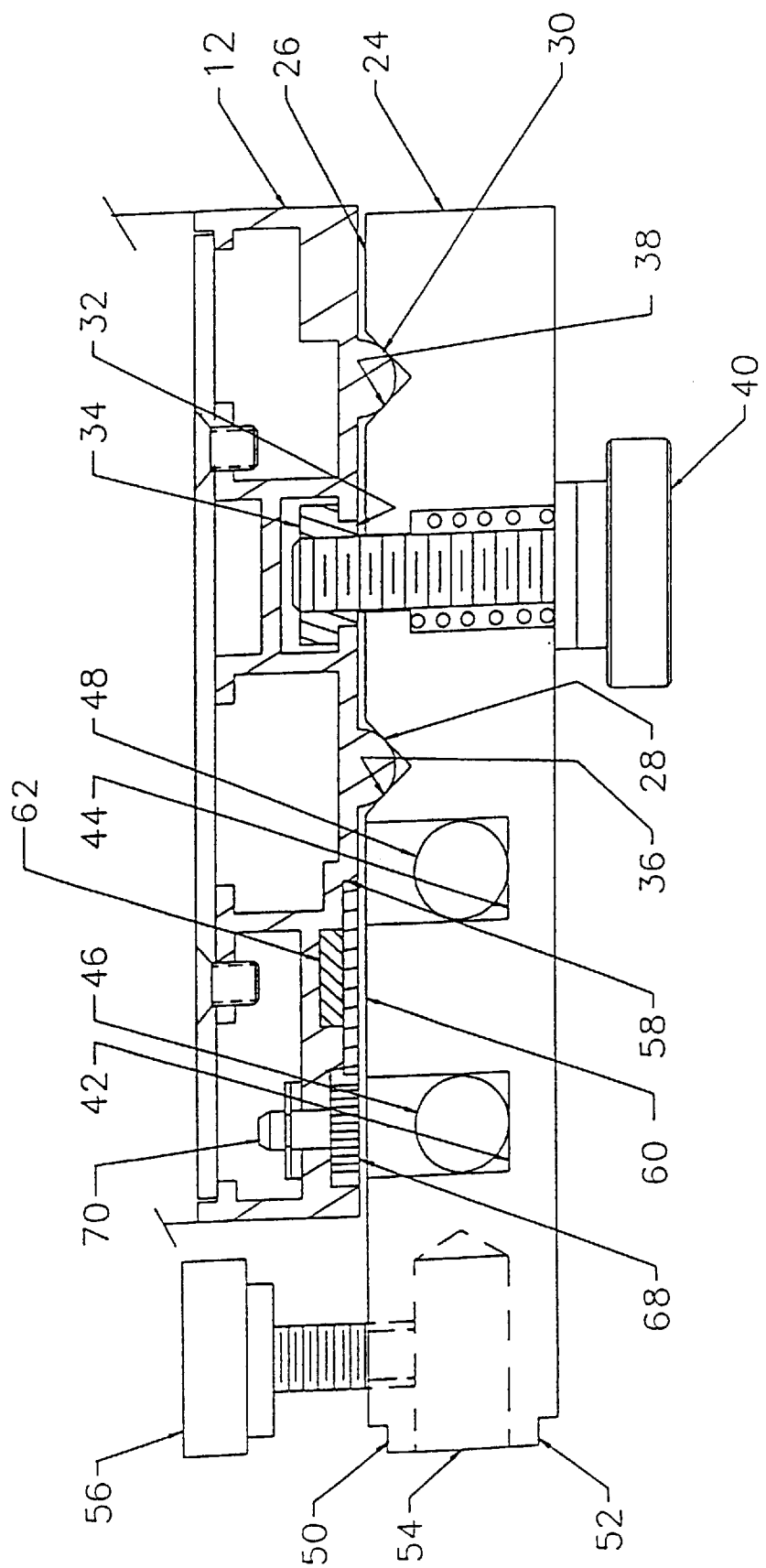
FIG. 2 is an enlarged transverse section thereof looking downward generally along the line 2—2 of FIG. 1.

FIG. 2 illustrates more details of the gage body 12, where it is shown in section. The gage body 12 is preferably an extrusion and, thus, has a similar cross-section throughout its length. At each end, the gage body 12 has four holes therein positioned so that they may accept the screws 16 through 22 for attachment of either end of the gage body to a base. The gage body may, thus, be positioned in an upright manner supported by the base 14, as shown in FIGS. 1 and 4. Measuring arm 24, seen in FIGS. 1, 2 and 4, is movable up and down the gage body so that it may be positioned at a selected distance from the lower end of the gage body or the bottom of the base 14.

FIG. 2 shows the gage body in more detail. The gage body 12 has a face 26, which is substantially planar except for the extruded configuration with respect to the general face. The face configuration includes parallel rails or ways 28 and 30. These rails are configured as half cylinders with the cylindrical axis lying on the plane of face 26. The rails are parallel to each other and extend the entire length of the gage body. Between the rails, slot 32 extends the length of the face. The slot is configured so that a T-nut 34 can be positioned therein and slide with respect to the length thereof.

Measuring arm 24 is a rectangular solid which has parallel V-grooves across its back. These V-grooves are separated the same distance as the rails 28 and 30 so that the V-grooves engage upon the rails, as indicated. Furthermore, the rails and V-grooves are sized so that the measuring arm is spaced from face 26 a small amount, as shown in FIG. 2. The only contact is of V-grooves against the rails. Thus, the measuring arm can be moved along the length of the gage body to a selected position. It can be secured in the selected position by clamping the measuring arm against the rails by tightening clamp screw 40. The clamp screw is threaded into nut 34. When tightened the nut cannot rotate with respect to the gage body because it is a square nut in the slot 32. Tightening of the clamp screw clamps the measuring arm against the rails to secure it in position. A slight loosening of the clamp screw permits the measuring arm to move along the rails with little freedom in other directions so that the measuring arm remains substantially parallel to itself as it moves along. The spring maintains pressure of the measuring arm against the guide rails when the clamp knob is loosened.

The measuring arm 12 is substantially a rectangular solid having two slots 42 and 44 therein, which are open on the V-groove side of the measuring arm. These slots respectively contain magnets 46 and 48 which are oriented so that they create magnetic fields substantially parallel to the V-grooves. At least one end of the measuring arm 24 extends beyond the edge of the gage body. In FIGS. 1 and 2, this is the left end of the measuring arm. The left end of the measuring arm has two key notches 50 and 52 therein and has a central opening 54 therein. The opening and the notches are arranged for the attachment of other measuring devices to the end of the measuring arm, as will be described subsequently. Lock screw 56 is threaded into the measuring arm and enters into the opening 54 so that it may clamp in the opening the shank of a supplemental measuring device, as described below.

Parallel to the rails, the face of gage body 12 has a slot 58 therein. The slot is sized to receive a standard steel scale, which is conventionally available to tool makers and mechanics. A steel scale 60 is shown positioned in the slot. Magnetic strip 62 is positioned in a recess in the back of the slot. The magnetic strip serves to hold the steel ruler or scale in place. As an additional means for retaining the ruler in its proper position in its slot 58, locking cams are also provided. Locking cams 64 and 66 are shown in FIG. 1, with locking cam 64 shown in more detail FIG. 3. The locking cam 64 comprises an eccentric slotted head 68 positioned in a recess next to the ruler 60. The head is in an open recess in which it can rotate on the axis of its shank 70, see FIG. 2, which extends through the front wall of the gage body. When the ruler is properly positioned, it is held in place by tightening these locking cams against it. There is a sufficient number of the locking cams to hold the ruler in place. The number depends on the length of the gage body and the associated ruler.

The measuring arm 24 can glide up and down the guide rods and always remain parallel to the top and bottom surfaces. The measuring arm 24 thus serves as an indicating device relative to the graduated scale 60 to establish distances between the scale and the measuring arm for later reference. Top and bottom surfaces of the measuring arm 24 thus remain parallel to the lower external surface so that measurements can be made therebetween. The width of the measuring arm in the direction of motion is known so that the measuring arm can be preset to known distances between the upper surface or the lower surface with respect to the bottom of the base unit. The measuring arm carries embedded magnets so that a steel blade can be detachably attached to extend the gaging surface.

In the primary usage of the gage, the top face of the measuring arm is set above the bottom surface of the gage the desired distance. Thereupon, the gage is placed upon the drill table and the drill bit is brought down to the top surface of the measuring arm. This is an adjustment of the height of the drill bit with the drill motor not running. In this way, the height of the drill bit above the table is precisely set. The measuring arm is of substantial height; for example, ¾ inch. If it is desired that the setting of the drill bit is to be less than that height, then the steel blade is placed under the measuring arm and held by the magnets. In this utilization of the gage, the lower edge of the measuring arm is the desired height above the surface and the drill bit is brought down to the top surface of the steel blade. In this way, the height of the drill bit above the table can be precisely preset.

The same utilization of the gage can be achieved in a table saw where the blade height above the table surface is measured. In that kind of setup, the bottom of the measuring arm is set at the desired height above the surface, and the table saw blade is brought up to the bottom of the measuring arm for precise setting of saw blade height.

As described above, the end of the measuring arm has a bored recess 54 therein for the detachable attachment of various auxiliary devices. The measuring arm has an upright notch on each side of the recess. FIG. 18 shows a scribing knife 72 on knife body 74. The body 74 is provided with a knob which tightens upon the scribing knife blade. The knife body 74 is mounted on a shank 76, which is inserted into the recess 54, and the knife body 74 is indexed by a shoulder 78 on the back of knife body 74 which engages in the notch 50 in the measuring arm. It is secured therein by tightening knurled knob 56, which tightens a threaded clamp post against shank 76 to secure to the scribing knife so that the scribing knife can scribe selected dimensions. The scribing knife blade and its shank are sized so that, when installed on the measuring arm, the knife edge is level with the top of the measuring arm. The scribing knife body can be rotated a half turn to be even with the bottom of the arm.

The measuring arm can be used to support a number of other different services which enhance the use of the level arm as a height gage. Referring to FIG. 18, step block 80 has a shank 82 which permits the step block 80 to be mounted and indexed on the measuring arm. The steps can be used to measure heights above the table. The gage of this invention can be used for many types of gaging activity in the tradesman's shop.

Another device which enhances the versatility of the height gage 10 of this invention is a depth gage 84 shown at the top of FIG. 18. The depth gage has a body 86 onto which is clamped a depth gage rod 88. The depth gage rod can be clamped with respect to the body at any position by means of clamp 90. The depth gage body 86 carries two shanks 92 and 94 so that the depth gage body may be mounted on the end of the measuring arm 24 in a position where the depth gage rod is parallel to the measuring arm or is positioned at a right angle with respect to the shank opening 54. The step block 80 and the body 86 have shoulders like shoulder 78 to assure indexing.

Figure 11:
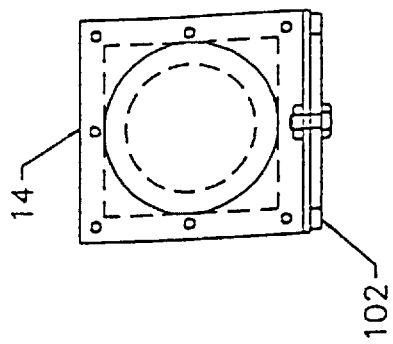
FIG. 11 is a plan view of the base used in connection with the measuring gage of FIGS. 1 through 10.
Figure 14:
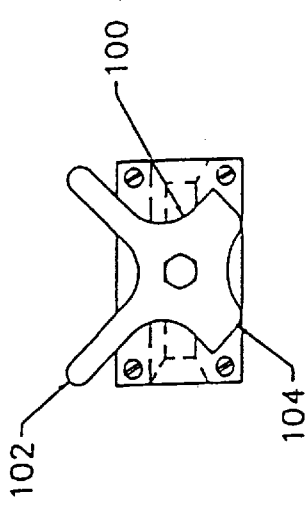
FIG. 14 is a front view of the base shown in FIG. 11.
Figure 12:
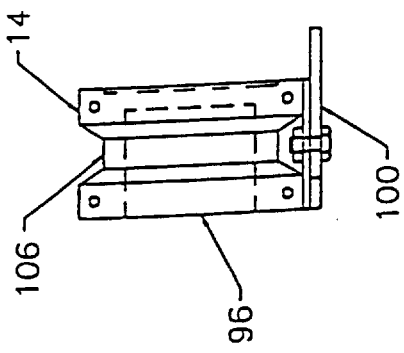
FIG. 12 is an edge view thereof.
Figure 13:
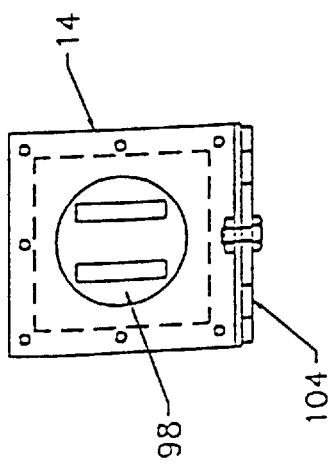
FIG. 13 is a bottom view thereof.

The base 14 is shown in FIGS. 11 through 14. The base 14 is square in plan view, as seen in FIGS. 11 and 13. The top and bottom surfaces are machined at a right angle to the side surfaces. Each of the side surfaces has four holes which are rectangularly arranged on the same pattern as the screw holes 16 through 22. Thus, the gage body can be mounted against any side of the base. Furthermore, the top and bottom faces of the base also have screw holes therein arranged in the same pattern, but since the base is only half the thickness as compared to its width, the screw holes are arranged in overlapping rectangular sets of screw holes so that a gage body can be attached to the top or bottom surface of the base in any rectangular position. The top and bottom surfaces of the base are relieved to reduce the bearing area on the support, and the bottom has a recess 96 which receives a magnet 98. The use of a magnet helps attach the base to a steel base plate support. Cam 100 is pivoted to one side of the base. The cam has two manually engageable levers 102 which force cam face 104 against the surface to which the base is magnetically attached. This helps remove the base. Furthermore, the sides of the base have a notch 106 extending therearound. The notch aids in grasping the base to move it from place to place.

It is important to notice that the base has attachment screw holes on all sides thereof. This permits attachment of multiple gage bodies to a base for arranging multiple configurations. For example, in FIG. 4, in addition to the gage body 12, a gage body 108 is attached to the base. The gage body 108 carries two measuring arms 110 and 112. These additional measuring arms can be set up to measure other dimensions on the device being manufactured or inspected. For example, the measuring arms can be set up as go/no go measurements from the surface on which the base is mounted.

FIGS. 5, 6 and 7 are respectively front, right and plan views of an assembly of bases and gage bodies. Base 114 carries gage body 116 in an upright position. Measuring arm 118 measures a Y-axis dimension from the support surface at the bottom of FIGS. 5 and 6. Gage body 120 carries measuring arm 122 to measure an X-axis dimension with respect to the face of gage body 116. Base 124 is shown in dashed lines in FIG. 7 and is attached behind the right end of body 120. Base 124 carries gage body 126 thereon. Measuring arm 128 moves along gage body 126 to measure the Z-axis dimension with respect to the face of gage body 120. Thus, a plurality of gage bodies may be attached together, and each may carry one or more measuring arms which are adjusted to a specific position to measure a specific dimension so that several dimensions can be checked.

Figure 9:
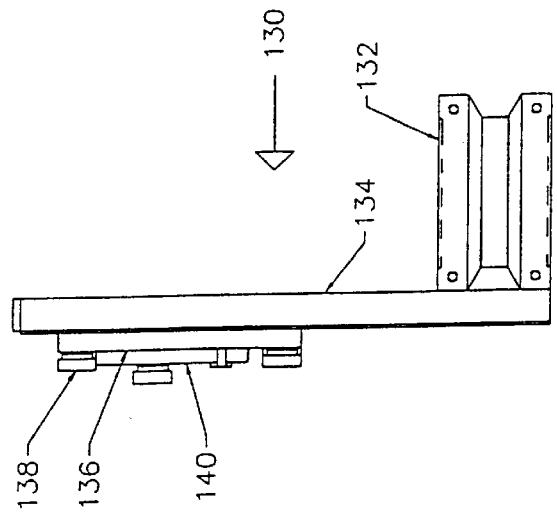
FIG. 9 is a right side elevational view thereof.
Figure 10:
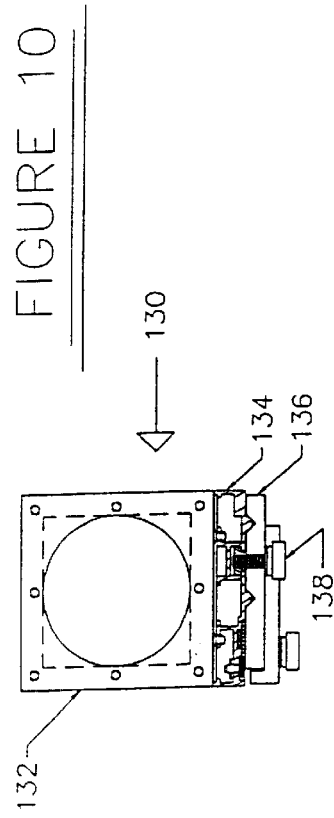
FIG. 10 is a plan view of the structure of FIG. 8.
Figure 8:
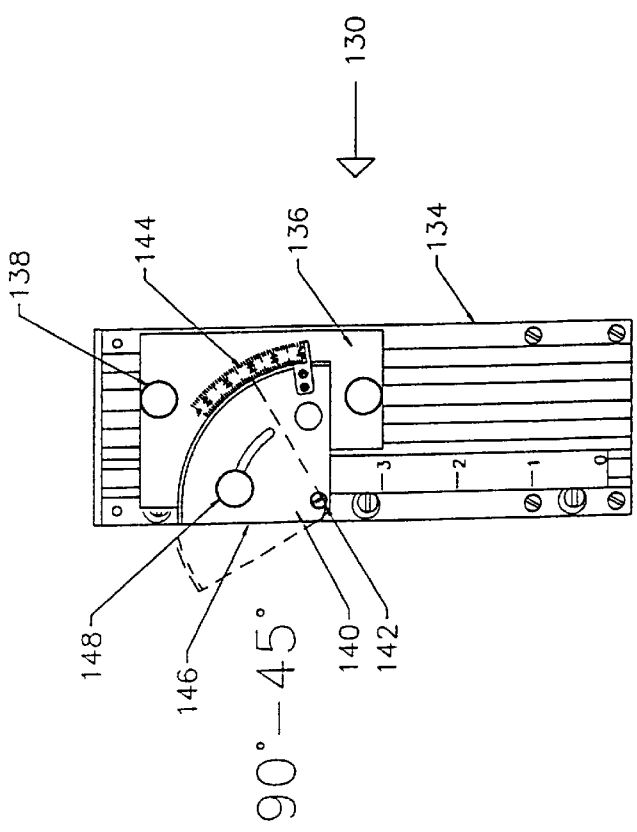
FIG. 8 is a front elevational view of the measuring gage of this invention shown equipped with a protractor for measuring the angularity of parts.

FIGS. 8, 9 and 10 show a measuring gage 130 which comprises a base 132 and a gage body 134 of the nature previously described. In the present instance, the gage body is used to carry a protractor. Protractor base 136 is slidably mounted on the rails which extend upward along gage body 134. When at the selected height, the protractor base can be locked to the gage body by tightening one of the two clamp screws. The upper clamp screw 138 is seen in FIGS. 8, 9 and 10. Protractor 140 is pivoted on protractor base on pivot pin 142. A reference mark on the protractor plate relates to angular scale 144 to indicate the angular position of the reference edge 146 of the protractor plate with respect to the edge of gage body 134. In this way, an angle can be measured or gaged. The protractor base can be moved up and down the gage body to place the reference edge at the correct location. Furthermore, the entire protractor can be turned upside down on the gage body to measure complementary angles.

Lock screw 148 extends through an arcuate slot in the protractor and is threaded into the protractor base. This permits locking of the protractor with respect to the protractor base by tightening of the lock screw.

Figure 15:
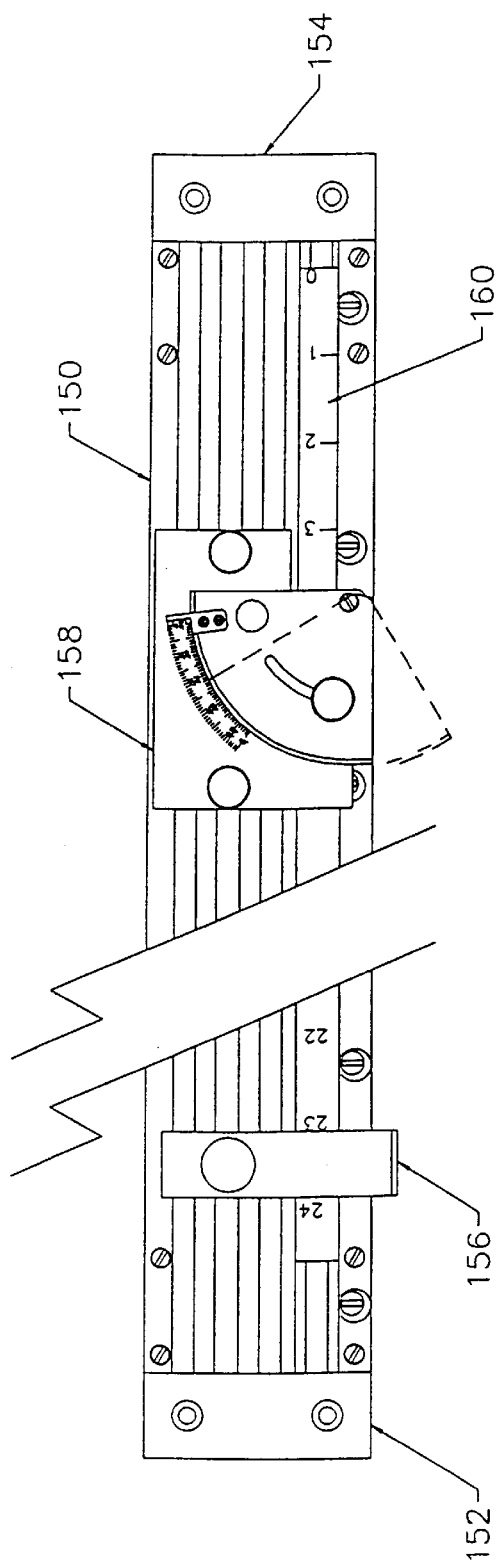
FIG. 15 is a plan view of a gage with a longer body, to be more useful in measuring lengths, with the gage body equipped with both a length measuring bar and a protractor, with parts broken away.
Figure 16:
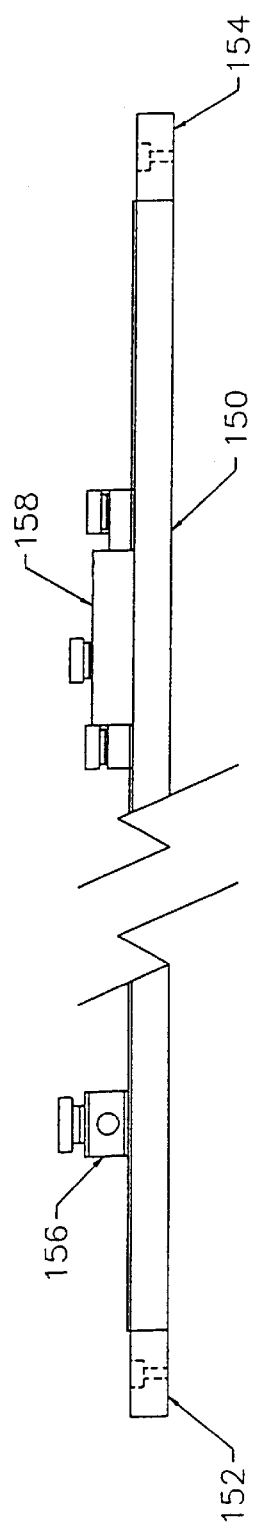
FIG. 16 is a front elevational view thereof.

FIGS. 15 and 16 show how the gage body 150 can be employed to measure lengths and angles. It is clear that the gage body 12 shown in FIG. 1 is fairly short because it is used in an upright orientation. However, this same body can be employed in horizontal orientation in longer lengths. The gage body 150 is the same as gage body 12, but has end caps 152 and 154 thereon. As seen in these FIGURES, the end caps are attached to the gage body and have holes therethrough so that the entire linear measuring system can be secured to a suitable support, if desired. The end caps serve as reference surfaces and prevent the measuring parts mounted on the gage body from becoming loose. As an example of measuring devices, measuring arm 156 and protractor 158 are illustrated. Multiple protractors and measuring arms can be used on one body depending on measuring needs. These are the same as previously described and are illustrative of suitable devices useable with the gage body to permit it to be used for measuring. The measuring arm can be placed a reference distance from either end. This distance can be established by steel ruler 160, which lies in the ruler slot. Thus, the gage of FIGS. 15 and 16 can be made as long as available rulers. In fact, the ruler does not need to lie adjacent the end, but may be set at any longitudinal position along the gage body by reference to a standard the same as the gage 10.

This concept can be expanded so that all measuring techniques described above can be produced in X-, Y and Z-axes. Each of the measurement features can be employed in any and all of the three axes. A machinist would need the higher accuracy of a dial indicator, while a casting foundry would only have need for less accuracy. A ruler on the measuring gage accommodates the measurement requirements of the foundry. A woodworker would require more accuracy when building a piece of furniture. Each trade has different measurement tolerance requirements. The measuring gage of this invention covers all those needs. The simple construction allows for its use in a production environment. As contrasted to a height gage, the measuring gage of this invention allows the user to take multiple measurements on the same axis and multiple measurements on all three axes. The measuring gage of this invention allows the production worker to measure parts on the production floor, due to its strength and inexpensive construction.

This invention has been described in its presently contemplated best embodiments, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A gage comprising:

a base, a support surface on said base;

a gage body for securement to said base, said gage body having a length direction, said gage body having a substantially uniform cross section throughout its length direction, said gage body having a face, at least one guide rail on said face, a slot in said gage body sized to removably receive a ruler and means in said gage body for releasably retaining a ruler in said ruler slot, said ruler slot extending lengthwise of said gage body;

means on said base and said gage body for mounting said gage body on said base in any one of a plurality of positions so that said gage body can be supported by said base with respect to said support surface; and a measuring arm mounted on said guide rail, first and second guide surfaces on said measuring arm and on said gage body, each comprising first and second hemi-cylindrical rails respectively engaging in first and second V-notches so that said measuring arm is movably mounted with respect to said gage body longitudinally of said gage body on said guide rail and means inter-engaging said measuring arm and said gage body for releasably locking said measuring arm with respect to said gage body.

2. The gage of claim 1 wherein said hemi-cylindrical rails are on said face of said gage body and said V-notches are in said measuring arm.

3. The gage of claim 1 wherein said locking means interengaging said measuring arm with respect to said gage body comprises a T-slot in said gage body extending in the lengthwise direction thereof and a nut in said T-slot, together with a screw extending through said measuring arm so that tightening said screw into said nut urges said measuring arm toward said gage body.

4. The gage of claim 1 wherein there is attachment means on said measuring arm so as to detachably attach measuring accessories to said measuring arm.

5. The gage of claim 4 wherein a step gage is attached to said attachment means.

6. The gage of claim 4 wherein a depth gage is attached to said measuring arm.

7. A gage comprising:

a base, a support surface on said base;

a gage body for securement to said base, said gage body having a length direction, said gage body having a substantially uniform cross section throughout its length direction, said gage body having a face, at least one guide rail on said face, a slot in said gage body sized to removably receive a ruler and means in said gage body for releasably retaining a ruler in said ruler slot, said ruler slot extending lengthwise of said gage body a ruler in said ruler slot in said face of said gage body and at least one locking cam adjacent said ruler slot so that said locking cam physically engages on said ruler in said ruler slot to releasably retain said ruler in said ruler slot;

means on said base and said gage body for mounting said gage body on said base in any one of a plurality of positions so that said gage body can be supported by said base with respect to said support surface; and a measuring arm mounted on said guide rail so that said measuring arm is movably mounted with respect to said gage body longitudinally of said gage body on said guide rail and means inter-engaging said measuring arm and said gage body for releasably locking said measuring arm with respect to said gage body.

8. The gage of claim 7 wherein there is a magnet in said gage body in said ruler slot so that a steel ruler is magnetically retained within said ruler slot.

9. A gage comprising:

a base, a support surface on said base, said base having four sides and being square and having threaded machine screw holes on each of said four sides of said square base, with said holes on each side being in the same pattern and corresponding in pattern to holes through said gage body so that said gage body can be attached on any one of said four sides of said base;

first and second gage bodies for securement to said base, said first and second gage bodies each having a length direction, said gage bodies having a substantially uniform cross section throughout their length direction, said gage bodies each having a face, at least one guide rail on said face, a slot in each said gage body sized to removably receive a ruler and means in each said gage body for releasably retaining a ruler in said ruler slot, said ruler slot extending lengthwise of said gage body; and a measuring arm mounted on at least one of said guide rails, so that said measuring arm is movably mounted with respect to said gage body longitudinally of said gage body on said guide rail and means inter-engaging said measuring arm and said gage body for releasably locking said measuring arm with respect to said gage body.

10. The gage of claim 9 wherein said base has a top and bottom and said top and bottom of said base are parallel to each other and at a right angle to each of said sides, said top and bottom of said base also having machine screw holes therein in said pattern so that said gage body can be selectively attached to said top and bottom of said base.

11. The gage of claim 10 wherein said base has a magnet therein to magnetically urge said base onto a steel surface.

12. The gage of claim 9 wherein said base has four sides and a top and a bottom and each of said sides has a notch thereon extending to both said adjacent sides so as to provide a finger recess in the sides of said base for manual lifting of said base.

13. The gage of claim 9 wherein a cam plate is rotatably secured to one of said sides of said base, said cam plate having a cam lever and a cam face thereon so that actuation of said lever causes said cam face to engage against the surface upon which said base is mounted to urge said base away from the surface.

14. A gage comprising:

a gage bar having a length direction, said gage bar having a substantially uniform cross section at a right angle to said length direction, said gage bar having a face, a ruler slot in said gage bar below said face extending in said longitudinal direction, means to releasably retain a ruler in said ruler slot a ruler in said ruler slot, said ruler having clamp means inter-engaging between said gage bar and said ruler to releasably retain said ruler in said ruler slot and to permit adjustment of said ruler along the length of said ruler slot;

guide means on said gage bar and extending in said longitudinal direction;

a measuring arm, said measuring arm having guide means thereon for inter-engaging with said guide means on said gage bar to permit said measuring arm to move in said longitudinal direction on said gage bar, said gage bar extending across said ruler slot and across a ruler in said ruler slot, said measuring arm having first and second spaced and parallel surfaces positioned adjacent said ruler slot so that said surfaces act as reference surfaces with respect to the ruler.

15. A gage comprising:

a gage bar having a length direction, said gage bar having a substantially uniform cross section at a right angle to said length direction, said gage bar having a face, a ruler slot in said gage bar below said face extending in said longitudinal direction, means to releasably retain a ruler in said ruler slot;

guide means on said gage bar and extending in said longitudinal direction;

a measuring arm, said measuring arm having guide means thereon for inter-engaging with said guide means on said gage bar to permit said measuring arm to move in said longitudinal direction on said gage bar, said gage bar extending across said ruler slot and across a ruler in said ruler slot, said measuring arm having first and second spaced and parallel surfaces positioned adjacent said ruler slot so that said surfaces act as reference surfaces with respect to the ruler; and attachment means on said measuring arm so as to detachably attach measuring accessories to said measuring arm.

16. The gage of claim 15 wherein a step gage is attached to said attachment means.

17. The gage of claim 15 wherein a depth gage is attached to said measuring arm.

18. A gage comprising:

a gage bar having a length direction, said gage bar having a substantially uniform cross section at a right angle to said length direction, said gage bar having a face, a ruler slot in said gage bar below said face extending in said longitudinal direction, means to releasably retain a ruler in said ruler slot;

guide means on said gage bar and extending in said longitudinal direction;

a measuring arm, said measuring arm having guide means thereon for inter-engaging with said guide means on said gage bar to permit said measuring arm to move in said longitudinal direction on said gage bar, a magnet in said measuring arm so that a steel straight edge can be magnetically attached to at least one surface of said measuring arm, said gage bar extending across said ruler slot and across a ruler in said ruler slot, said measuring arm having first and second spaced and parallel surfaces positioned adjacent said ruler slot so that said surfaces act as reference surfaces with respect to the ruler.

19. The gage of claim 18 wherein said magnet in said measuring arm is positioned between said reference surfaces of said measuring arm so that a steel straight edge can be magnetically retained on either of said reference surfaces of said measuring arm.

20. A gage comprising:

a gage bar having a length direction, said gage bar having a substantially uniform cross section at a right angle to said length direction, said gage bar having a face, a T-slot in said gage bar extending in said longitudinal direction and a nut in said T-slot, a ruler slot in said gage bar below said face extending in said longitudinal direction, means to releasably retain a ruler in said ruler slot;

guide means on said gage bar and extending in said longitudinal direction;

a measuring arm, said measuring arm having guide means thereon for inter-engaging with said guide means on said gage bar to permit said measuring arm to move in said longitudinal direction on said gage bar, an opening through said measuring arm and a screw extending through said opening and threadedly engaged in said nut in said T-slot so that tightening said screw tightens said measuring arm against said guide means on said face of said gage bar, said gage bar extending across said ruler slot and across a ruler in said ruler slot, said measuring arm having first and second spaced and parallel surfaces positioned adjacent said ruler slot so that said surfaces act as reference surfaces with respect to the ruler.

21. A gage comprising:

a gage bar having a length direction, said gage bar having a substantially uniform cross section at a right angle to said length direction, said gage bar having a face, a ruler slot in said gage bar below said face extending in said longitudinal direction, means to releasably retain a ruler in said ruler slot;

guide means on said gage bar and extending in said longitudinal direction;

a measuring arm, said measuring arm having guide means thereon for inter-engaging with said guide means on said gage bar to permit said measuring arm to move in said longitudinal direction on said gage bar, said gage bar extending across said ruler slot and across a ruler in said ruler slot, said measuring arm having first and second spaced and parallel surfaces positioned adjacent said ruler slot so that said surfaces act as reference surfaces with respect to the ruler; and a protractor base, said protractor base having guide means thereon for inter-engagement with said guide means on said gage bar for longitudinal motion along said gage bar, said protractor base having a protractor thereon and indicia between said protractor and said protractor base for indicating the angular position of said protractor with respect to said protractor base.

22. The gage of claim 21 further including means for releaseably clamping said protractor base with respect to said protractor body at a selected position along the length of said gage bar.

* * * * *